3,145,139
LOW-FREEZING METHYL PARATHION SOLUTIONS

Ralph B. Fearing, Hammond, Ind., assignor to Stauffer Chemical Company, New York, N.Y., a corporation of Delaware
No Drawing. Filed Nov. 19, 1962, Ser. No. 238,762
3 Claims. (Cl. 167—30)

The present invention is directed to non-phytotoxic methyl parathion solutions which remain liquid at moderately low temperatures and liquify quickly after being slightly crystallized at even lower temperatures.

Methyl parathion (alternatively denoted herein as MPT) is a recognized effective pesticide used primarily in agricultural applications where it is applied directly to living plants to protect the same against the destructive effects of insects and the like. For instance, it is used in large amounts in cotton-growing areas to protect against the boll weevil, bollworm, aphids, and the like. Although usually applied to plants from dilute aqueous dispersions, methyl parathion is advantageously supplied commercially to formulators in concentrated solutions consisting of from 80 to 85% by weight of the toxic material with the remainder being solvents and stabilizers. For example, a typical commercial methyl parathion solution will consist of 82% MPT, including about 2% technical impurities, 16% xylene (the solvent), and 2% stabilizer. Unfortunately, incipient crystallization (freezing) of MPT from such concentrated solutions will begin at a temperature of about 65-67° F., and the crystals formed will often not redissolve without great difficulty when the MPT solution is brought back to room temperature. The crystallized MPT can, of course, be redissolved if the container is heated and agitated, but such procedure is unsatisfactory since it is extremely hazardous and time consuming. In actual practice, therefore, the formation of crystals in concentrated methyl parathion solutions at relatively high ambient temperatures presents a serious, heretofore unsolved, problem.

An object of this invention is to provide non-phytotoxic concentrated methyl parathion solutions which will crystallize at lower temperatures than MPT solutions available heretofore.

Another object of the invention is to provide non-phytotoxic concentrated methyl parathion solutions which, when crystallized, will redissolve at room temperature without agitation.

I have now found that the xylene may be replaced with a triple solvent mixture consisting of naphthalene, acetonitrile, and acetone to furnish methyl parathion solutions having incipient crystallization points between 54° and 56° F. Of at least equal importance, MPT solutions comprising the aforesaid mixed solvents do not crystallize to the same degree as the xylene solutions and easily redissolve upon standing at room temperature (above 60° F.). Further, when substituted for xylene in concentrated methyl parathion solutions, the mixed solvents have been found to have no adverse effect on plant life at the concentrations normally employed in agricultural applications.

The compositions of the present invention will comprise between 80% and 85% MPT (which will normally include about 1.5% to 3% technical impurities), from 0% to 5% stabilizer, and from 10% to 20% mixed solvents, viz., naphthalene, acetonitrile, and acetone. The solvent mixtures are further limited to mixtures consisting of from 1.5% to 8.5% naphthalene, 2.0% to 5% acetonitrile, and 3% to 7% acetone. One particularly preferred MPT solution will consist of approximately 82.5% MPT, 8% naphthalene, 3% acetonitrile, and 6.5% acetone. A preferred composition comprising an MPT stabilizer will consist of approximately 82.5% MPT, 2% stabilizer, 6% naphthalene, 3% acetonitrile, and 6.5% acetone.

In order to achieve depression of the freezing point and the desired dissolution characteristics of the invention, all three of the above-mentioned solvents are required. Each substance is selected for its particular effect upon the freezing point, flash point, dissolution characteristics, etc. For example, to conform with legal, as well as practical, requirements, the flash point of the MPT solutions should not be below about 80° F. Acetone, the chief substance used to depress the freezing point, may not be used in amounts greater than about 7% by weight of the total composition since higher percentages will depress the flash point below a safe limit. The freezing point is depressed further by the use of acetonitrile, which has a less pronounced effect upon lowering the flash point than acetone. Naphthalene, while it will have some slight depressing effect upon the freezing point, will, more significantly, raise the flash point. The MPT stabilizing compound, which may consist of triethyl phosphate, methyl butynol, furfuryl alcohol, and mixtures thereof (see U.S. Patent 3,060,083) may be substituted in place of an equivalent weight of naphthalene, and usually will effect an equivalent rise in the flash point. The inclusion of some naphthalene in the solvent mixture appears to be very helpful, however, indirectly aiding the re-dissolution of any crystals which may form. Although invention is not predicated upon any specific theory expressed herein, there is some evidence to indicate that naphthalene tends to co-crystallize with methyl parathion when the solution is held below the freezing point. The co-crystallized naphthalene tends to minimize the size of the MPT crystals formed and, therefore, indirectly accelerates the rate of dissolution of methyl parathion. On the other hand, the naphthalene should not exceed 8.5% by weight of the methyl parathion solution or crystallization of naphthalene may occur above the crystallization point of methyl parathion.

The following specific examples will further illustrate the invention but should not be construed as unduly limiting the broader aspects thereof.

EXAMPLE 1

The following mixture was placed in a laboratory beaker and agitated until a homogeneous solution formed:

|  | Grams |
|---|---|
| Methyl parathion (80% MPT+2.3% technical impurities) | 329.2 |
| Crude, dried naphthalene (7.9%) | 31.6 |
| Acetonitrile (3.3%) | 13.2 |
| Acetone (6.5%) | 26.0 |

This solution was found to have a freezing point of 54° F. To test the freezing characteristics, test tubes filled with the solution were placed in constant temperature baths at temperatures ranging from 60° F. down to 32° F. The results of this test are shown in Table I wherein, for comparison purposes, the data for a solution comprising about 82.5% MPT and 17.5% xylene are included.

*Table I*

EFFECTS OF LOW TEMPERATURES ON METHYL PARATHION SOLUTIONS

| Temperature | Solution 1<br>Solvent: 7.9% naphthalene; 3.3% acetonitrile; 6.5% acetone | Solution 2<br>Solvent: 17.5% xylene |
|---|---|---|
| 60° F | No crystals when seeded and agitated. | 5% by weight crystals formed when agitated. |
| 57° F | ___do___ | 25% by weight crystals when seeded and agitated. |
| 50° F | No crystals when seeded—with agitation 5% by weight of crystals formed. | 40% by weight crystals—about 10% did not redissolve at R.T. in 17 hours. |
| 47° F | 10% crystals when agitated—redissolved at R.T. | |
| 41–2° F | 20–25% crystals which redissolved completely at R.T. | >70% crystals—about 20% did not redissolve at R.T. in 17 hours. |
| 32° F | Crystals nearly all redissolved during attempt to filter them cold. | |

NOTE.—R.T.=room temperature. Seeding was accomplished by gently placing a "pure" MPT crystal in the test solution.

From the above table, it may be seen that the solution comprising the triple solvent of the invention did not crystallize at temperatures of 57° F. or above, and that even at a temperature down as low as 50° F., no crystals formed when the solution was seeded. When crystals were observed to form in the preferred solution, they were easily redissolved at room temperatures (without agitation). By comparison, the methyl parathion formulation comprising the xylene solvent did not readily redissolve at room temperature even after standing overnight. A further observation, not shown in the table, was that the crystals formed in the triple solvent solution remained soft (slush-like) and were easily dispersed by agitation, while the crystals formed in the xylene solution tended to form into a rigid mass. Said another way, the crystals in the novel solvent system remained soft and "mashy" while those formed in the xylene solution produced a solid (ice-like) mass. The rapidity with which the crystals in the preferred triple solvent redissolve is considered to be an important, if not critical, feature of the present invention. Even under very low temperatures where crystals form in the triple solvent solution, they are easily redissolved without agitation by bringing the solution to room temperature.

EXAMPLE 2

The following methyl parathion solution was prepared by the procedure described in Example 1:

| | Percent |
|---|---|
| Methyl parathion | 82.6 |
| Naphathalene | 7.0 |
| Acetonitrile | 4.2 |
| Acetone | 6.2 |

The above composition was found to have a freezing point at 54° F. and a flash point at 95° F. (open cup). The crystals formed at temperatures as low as at least 32° F. were easily redissolved upon warming the composition to room temperature.

EXAMPLE 3

The following methyl parathion solution was prepared in accordance with Example 1:

| | Percent |
|---|---|
| Methyl parathion (1.5–2.5% technical impurities) | 82.5 |
| Naphthalene | 8.0 |
| Acetonitrile | 2.5 |
| Acetone | 7.0 |

This solution was found to have an incipient freezing point at 54–55° F. and a flash point (open cup) at 81° F. When tested for low temperature characteristics in the manner outlined in Example 1, this solution was found to remain liquid at temperatures as low as 40° F. (when not agitated or seeded), and redissolve quickly at room temperature without agitation when crystallized at lower temperatures.

EXAMPLE 4

The following methyl parathion composition was prepared in accordance with the procedure outlined in Example 1:

| | Percent |
|---|---|
| Methyl parathion (1.5–2.5% technical impurities) | 82.5 |
| Naphthalene | 6.0 |
| Acetonitrile | 3.0 |
| Acetone | 6.5 |
| Triethyl phosphate | 2.0 |

This composition was found to have a freezing point at approximately 55° F. and a flash point (open cup) at about 80° F. When tested in accordance with the procedure outlined in Example 1, the composition remained liquid down to about 40° F. (when unseeded or unagitated), and redissolved quickly when crystallized at lower temperatures.

EXAMPLE 5

To simulate actual storage conditions under which methyl parathion would be subjected in commercial use, two drums (55 gal. each) were prepared according to the following compositions.

Drum No. 1:

| | Pounds |
|---|---|
| Methyl parathion (82.5%) | 456.0 |
| Crude naphthalene (8.0%) | 44.0 |
| Acetonitrile (3.0%) | 16.5 |
| Acetone (6.5%) | 35.8 |

(Freezing point 55° F., open cup flash point above 80° F.).

Drum No. 2:

| | Percent |
|---|---|
| Methyl parathion by weight | 82.5 |
| Xylene by weight | 17.5 |

(Freezing point 65–66° F., approximate total weight 550 pounds.)

Both drums were placed in an unsheltered area in the open air for a forty-eight hour period during which time the lowest recorded temperatures were 29° F. and 37° F. (during successive nights). On examination Drum No. 1 appeared to have undergone little or no crystallization, while Drum No. 2 was severely crystallized (12 to 15 inches solid cake on bottom).

Drum No. 1 was then caused to freeze by placing it in an ice water bath for seventy-two hours. Crystals accumulated around the sides of the drum at approximately the same rate as the build-up on the bottom. This is in contrast with the xylene solvent system which forms a hard mass of crystals in the bottom third of the drum. Crystals formed in Drum No. 1 remained soft and were deposited to a depth of 10 to 12 inches. Both drums were then transferred to a heated warehouse (72–75° F.) and allowed to stand for several days with no agitation. They were probed each day with a glass rod to determine crystal depth. The Drum No. 2 material underwent little or no redissolving, while the crystal layer in Drum No. 1 was reduced to 3 to 4 inches at the bottom with no deposit around the sides. After seven days in the heated warehouse, both drums were rolled back and forth and sampled. No analysis was made on the Drum No. 2 material since it still contained crystals. The triple solvent material was essentially all redissolved and the contents of the drum was sampled and found to contain 82.1% MPT upon analysis.

EXAMPLE 6

The solution of Drum No. 1, shown in the preceding example, was formulated to furnish emulsifiable liquids which could be dispersed in water and applied directly to cotton and other plant life. The methyl parathion was formulated both as the sole toxicant and in mixtures comprising Endrin and DDT. For comparison purposes, a control formulation comprising DDT and methyl parathion (in xylene solvent) in a ratio of 3 parts of the former to 1 part of the latter was prepared. The formulas are hereinafter designated as follows.

Formula 1: MPT _____ 4 lbs./gal. (Drum No. 1, Example 5).

Formula 2:
    Endrin _____ 1.6 lbs./gal.
    MPT _____ 1.6 lbs./gal. (Drum No. 1, Example 5).

Formula 3:
    DDT _____ 3 lbs./gal.
    MPT _____ 1 lbs./gal. (Drum No. 1, Example 5).

Formula 4 (control):
    DDT _____ 3 lbs./gal.
    MPT _____ 1 lbs./gal. (regular xylene solvent material).

Each of the above formulations was prepared by physically admixing the toxicant solution with a solvent (xylene substitute) and an emulsifying agent (Sponto 217 and/or 221). The formulations comprising mixed toxicants also included a small amount of epichlorohydrin, about 0.25–0.30% by weight of the total formulation.

Each of the above formulations was evaluated for phytotoxic results and insect control. The solutions were dispersed in water in a small tank and applied with a sprayer to the plants. The results of preliminary tests are shown in Tables II and III which follow:

Table II
PRELIMINARY TEST 1—COTTON [1]

| Formula | Rate [2] (pints of formula/acre) | Phytotoxicity [3] | Insects controlled |
|---|---|---|---|
| 1 | 1 | Slight leaf burn | Boll weevil, thrips, aphids, fleahoppers. |
| 2 | 1 | ___do___ | Boll weevil, thrips, aphids, fleahoppers, bollworms. |
| 3 | 4 | ___do___ | Do. |
| 4 | 4 | ___do___ | Do. |

[1] 0.1 acre each plot; Temperature=92° F.; Wind=none; Relative Humidity=45%.
[2] 2 gal. total liquid (formula+water) per acre.
[3] Evaluated visually after 48 hours.

Table III
PRELIMINARY TEST 2—COTTON [1]

| Formula | Rate [2] (pints of formula/acre) | Phytotoxicity [3] | Insects controlled |
|---|---|---|---|
| 1 | 1 | None | Boll weevil, thrips, aphids, fleahoppers. |
| 2 | 1 | ___do___ | Boll weevil, thrips, aphids, fleahoppers, bollworms. |
| 3 | 4 | ___do___ | Do. |
| 4 | 4 | ___do___ | Do. |

[1] 0.1 acre each plot; Temperature=85° F.; R.H.=45%.
[2] 4 gal. total liquid per acre.
[3] Evaluated visually after 48 hours.

The formulations were then applied to larger field plots on a regular schedule. In these tests, the methyl parathion dispersions were applied by aerial spraying at the rate of 2.5–3.0 gallons of liquid per acre of planted cotton. The results of these tests are presented in the following tables:

Table IV
FIELD TESTS—COTTON—8 ACRES
[Weslaco, Texas, Rio Grande Valley]

| Formula | Rate (pints of formula/acre) | Phytotoxicity [1] | Insects controlled |
|---|---|---|---|
| 3 | 4 | None | Boll weevil, aphids, bollworm. |
| 3 | 4 | ___do___ | Do. |
| 3 | 4 | ___do___ | Do. |
| 3 | 4 | ___do___ | Do. |
| 4 | 4 | ___do___ | Do. |
| 4 | 4 | ___do___ | Do. |
| 4 | 4 | ___do___ | Do. |
| 4 | 4 | ___do___ | Do. |

[1] Each evaluation made 24 to 48 hours after spraying.

Table V
FIELD TESTS—COTTON—10 ACRES
[Elsa, Texas, Rio Grande Valley]

| Formula | Rate [1] (pints of formula/acre) | Phytotoxicity [2] | Insects controlled |
|---|---|---|---|
| 2 | 1 | None | Boll weevil, aphids, bollworms. |
| 2 | 2 | ___do___ | Do. |
| 2 | 2 | ___do___ | Do. |
| 2 | 2 | ___do___ | Do. |
| 2 | 2 | ___do___ | Do. |
| 2 | 2 | ___do___ | Do. |

[1] 2.5 gallons of total liquid per acre.
[2] Evaluated after 24 to 48 hours.

Table VI
FIELD TESTS—COTTON—10 ACRES
[East of Santo Maria, Texas, Rio Grande Valley]

| Formula | Rate [1] (per acre) | Phytotoxicity (24 to 48 hrs. after app.) | Insects controlled |
|---|---|---|---|
| 1+DDT [2] | 1 pt. Formula 1+2 pts. DDT.[2] | None | Boll weevil, aphids, bollworms. |
| 1+DDT | ___do___ | ___do___ | Do. |
| 1+DDT | ___do___ | ___do___ | Do. |
| 1+DDT | ___do___ | ___do___ | Do. |
| 1+DDT | ___do___ | ___do___ | Do. |
| 1+DDT | ___do___ | ___do___ | Do. |
| 1+DDT | ___do___ | ___do___ | Do. |
| 1+DDT | ___do___ | ___do___ | Do. |

[1] 3.0 gal. total liquid per acre.
[2] DDT formulation contained 3 lbs. DDT/gal. of formula.

In all of the preliminary tests and field trials, the triple solvent solutions of the invention were found to produce good insect kill with no significant plant injury. When tested under controlled conditions, the experimental solutions were found to have approximately the same physiological effect upon plants, e.g., cotton, soybeans, pinto beans, tomatoes, etc., as the xylene-based solutions of the prior art with approximately the same degree of insect control. Further, the experimental solutions were found to be compatible with some of the most popular other pesticides when formulated therewith in various ratios.

No unnecessary limitations should be implied from the foregoing specific MPT solutions and formulations since other solutions and formulations with the scope of the invention may be equally advantageous.

What I claim is:

1. A non-phytotoxic methyl parathion composition comprising the following substances in approximately the indicated proportions:

|  | By weight, percent |
|---|---|
| Methyl parathion and technical impurities | 80.0–85.0 |
| Naphthalene | 1.5–8.5 |
| Acetonitrile | 2.0–5.0 |
| Acetone | 3.0–7.0 |
| Stabilizers | 0.0–5.0 |

2. The non-phytotoxic methyl parathion composition comprising the following substances in approximately the indicated proportions:

| | By weight, percent |
|---|---|
| Methyl parathion and technical impurities | 82.5 |
| Naphthalene | 8.0 |
| Acetonitrile | 3.0 |
| Acetone | 6.5 |

3. The non-phytotoxic methyl parathion composition comprising the following substances in approximately the indicated proportions:

| | By weight, percent |
|---|---|
| Methyl parathion and technical impurities | 82.5 |
| Naphthalene | 6.0 |
| Acetonitrile | 3.0 |
| Acetone | 6.5 |
| Stabilizers | 2.0 |

No references cited.